US008595364B2

(12) United States Patent
Yahalom et al.

(10) Patent No.: US 8,595,364 B2
(45) Date of Patent: *Nov. 26, 2013

(54) SYSTEM AND METHOD FOR AUTOMATIC STORAGE LOAD BALANCING IN VIRTUAL SERVER ENVIRONMENTS

(71) Applicant: NetApp, Inc., Sunnyvale, CA (US)

(72) Inventors: Raphael Yahalom, Needham, MA (US); Assaf Levy, Palo Alto, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,504

(22) Filed: Jan. 24, 2013

(65) Prior Publication Data

US 2013/0139160 A1 May 30, 2013

Related U.S. Application Data

(63) Continuation of application No. 12/339,733, filed on Dec. 19, 2008, now Pat. No. 8,386,610.

(60) Provisional application No. 61/009,632, filed on Dec. 31, 2007.

(51) Int. Cl.
 G06F 15/173 (2006.01)
 G06F 9/455 (2006.01)
(52) U.S. Cl.
 USPC .............................. 709/226; 718/1
(58) Field of Classification Search
 None
 See application file for complete search history.

(56) References Cited

U.S. PATENT DOCUMENTS

| | | | |
|---|---|---|---|
| 6,088,717 A | 7/2000 | Reed et al. | |
| 6,636,981 B1 | 10/2003 | Barnett et al. | |
| 6,985,937 B1 | 1/2006 | Keshav et al. | |
| 7,194,538 B1 | 3/2007 | Rabe et al. | |
| 7,523,286 B2 * | 4/2009 | Ramany et al. | 711/170 |
| 8,230,069 B2 * | 7/2012 | Korupolu | 709/226 |
| 2004/0010787 A1 | 1/2004 | Traut et al. | |
| 2004/0205089 A1 * | 10/2004 | Alon et al. | 707/200 |
| 2004/0225926 A1 * | 11/2004 | Scales et al. | 714/43 |
| 2006/0004830 A1 | 1/2006 | Lora et al. | |
| 2006/0020691 A1 * | 1/2006 | Patterson et al. | 709/223 |
| 2006/0069761 A1 * | 3/2006 | Singh et al. | 709/222 |
| 2007/0192329 A1 | 8/2007 | Croft et al. | |
| 2007/0198722 A1 | 8/2007 | Kottomtharayil et al. | |
| 2008/0141264 A1 * | 6/2008 | Johnson | 718/105 |
| 2008/0270564 A1 * | 10/2008 | Rangegowda et al. | 709/212 |
| 2009/0025007 A1 * | 1/2009 | Hara et al. | 718/105 |
| 2009/0199177 A1 * | 8/2009 | Edwards et al. | 718/1 |

OTHER PUBLICATIONS

International Search Report and Written Opinion dated Mar. 26, 2009 in International Application No. PCT/US2008/103930.
Lee et al., Sorage Network Management Software—The Critical Enabler of Maximum ROI, Storage Consulting Group (Dec. 16, 2002).

* cited by examiner

*Primary Examiner* — Keith Vicary
(74) *Attorney, Agent, or Firm* — Fulbright & Jaworski LLP

(57) ABSTRACT

Methods and systems for periodically analyzing and correcting storage load imbalances in a storage network environment including virtual machines are described. These methods and systems account for various resource types, logical access paths, and relationships among different storage environment components. Load balancing may be managed in terms of input/output (I/O) traffic and storage utilization. The aggregated information is stored, and may be used to identify and correct load imbalances in a virtual server environment in order to prevent primary congestion and bottlenecks.

33 Claims, 11 Drawing Sheets

FIG. 6

| Virtual Machines (9) | | | | | | | | |
|---|---|---|---|---|---|---|---|---|
| Name | State | Volume | Volume Ca... | Datastore | RDM | Datastore Capacity | Datastore Free Capacity | Virtual Machine Capacity |
| 68 | running | 33 | 250.00 | 33 | | 249.00 | 65.00 | 13,312.00 |
| 20 | running | 41 | 250.00 | 42 | | 249.00 | 48.00 | 17,408.00 |
| 85 | running | 42 | 250.00 | 41 | | 249.00 | 37.00 | 14,336.00 |
| 20 | poweredOff | 42 | 250.00 | 41 | | 249.00 | 37.00 | 9,000.00 |
| 70 | running | 44 | 250.00 | 44 | | 249.00 | 51.00 | 14,336.00 |
| 83 | running | 44 | 250.00 | 44 | | 249.00 | 51.00 | 21,504.00 |
| 82 | running | 45 | 250.00 | 45 | | 249.00 | 102.00 | 13,312.00 |
| 41 | running | 45 | 250.00 | 45 | | 249.00 | 102.00 | 14,336.00 |
| W2K3 | poweredOff | 45 | 250.00 | 45 | | 249.00 | 102.00 | 20,480.00 |

*FIG. 8*

SYSTEM AND METHOD FOR AUTOMATIC STORAGE LOAD BALANCING IN VIRTUAL SERVER ENVIRONMENTS

CROSS-REFERENCE TO RELATED APPLICATIONS

The present application is a continuation of co-pending, commonly assigned, patent application Ser. No. 12/339,733 entitled "SYSTEM AND METHOD FOR AUTOMATIC STORAGE LOAD BALANCING IN VIRTUAL SERVER ENVIRONMENTS," filed Dec. 19, 2008, which itself claims the benefit of U.S. Provisional Application No. 61/009,632 filed Dec. 31, 2007, the contents of which are hereby incorporated by reference in their entirety.

TECHNICAL FIELD

The systems and methods generally relate to the field of load balancing and storage management in virtual server storage network environments.

BACKGROUND OF THE INVENTION

A SAN or storage area network, an example of a storage network environment, is a network dedicated to enabling multiple applications on multiple hosts to access, i.e., read and write, data stored in consolidated shared storage infrastructures. SANs commonly use fiber channel for communications between components in the SAN. Some storage network environments, including network-attached storage (NAS) and hierarchical storage management (HSM), may use a network file system (NFS) for network communications. Traditional storage environments use Direct Attached Storage (DAS), which does not involve the use of a network. However, DAS environments may be combined with HSMs and/or NASs and/or SANs to create a storage network environment. In general, storage network environments may include one or more SANs, one or more HSMs, one or more NASs, and one or more DASs, or any combination thereof.

A SAN consists of SAN devices, for example, different types of switches, storage components, and physical servers or hosts, which are interlinked, and is based on a number of possible transfer protocols such as Fiber Channel and iSCSI. Each server is connected to a SAN with one or more network cards, for example, a Host Bus Adapter (HBA). Applications are stored as data objects on storage devices in storage units e.g. Logical Unit Numbers (LUNs). A data object generally comprises at least one of a volume, a datastore, and a file system. The storage device may be used to store data related to the applications on the host.

Enterprise SANs are increasingly supporting most of the business critical applications in enterprises. As a result, these SANs are becoming increasingly large and complex. A typical SAN in a Fortune 500 company may contain hundreds or thousands of servers and tens or hundreds of switches and storage devices of different types. The number of components and links that may be associated with the data transfer from each given application and one or more of its data units may increase exponentially with the size of the SAN. This complexity, which is compounded by the heterogeneity of the different SAN devices, leads to high risk and inefficiency. Changes to the SAN (which need to happen often due to the natural growth of the SAN) take a long time to complete by groups of SAN managers, and are error-prone. For example, in many existing enterprises a routine change (such as adding a new server to a SAN) may take 1-2 weeks to complete, and a high percentage of these change process (sometime as high as 30-40%) include at least one error along the way. It is estimated that around 80% of enterprise SAN outage events are a result of some infrastructure change-related event.

The complexity of storage network environments has recently been further complicated by the increasing adoption of virtual servers or virtual machines (VMs) as hosts within storage network environments. As disclosed in commonly-assigned U.S. patent application Ser. No. 12/283,163 filed on Sep. 9, 2008, the contents of which are incorporated herein in their entirety, a virtual server is a server with a virtualization layer which enable multiple separate virtual machines, each being a separate encapsulation of an operating system and application, to share the resources on that server while each VM is executing in exactly the same way as on a fully-dedicated conventional server. VMs can rapidly and seamlessly be shifted from one physical server to any other one in the server resource pool, and in that way optimally utilize the resources without affecting the applications. Such a virtualization of the physical servers, or virtualization of the storage network environment, allows for efficiency and performance gains to be realized. These gains may be realized in terms of service-level metrics or performance metrics, e.g., storage capacity utilization, server utilization, CPU utilization, data traffic flow, load balancing, etc. It is well known that the higher the number of VMs compressed onto a physical server, the greater the savings. A major benefit of VMs is their ability to stop, shift and restart on different physical servers or hosts. For each physical server or host that is retired in place of a virtual server, there is a corresponding reduction in power, space and cooling requirements. The number of network interface cards, network cables, switch ports, HBAs, fiber channel cables and fiber channel ports are all reduced. These cost reductions are significant, and when compounded with the performance and/or efficiency gains, allow for a much more well-managed storage network environment. In general, the goal of SAN administrators is to maximize resource utilization while meeting application performance goals. Maximizing resource utilization means placing as many VMs per physical server as possible to increase CPU, network, memory, SAN and storage array utilization.

In the recent past, companies have been adopting virtualization applications such as VMware™, Microsoft™ Virtual Server, NetApp SnapShot™, NetApp SnapMirror™, and XEN™. These applications reduce underutilization by enabling data center teams to logically divide the physical servers e.g. x86 servers or hosts into a single, dual, quad or even eight-way and above independent, securely-operating virtual server or virtual machine (VM) systems. As explained above, consolidating five, ten, twenty, or even forty server images onto one physical server has tremendous benefit.

In particular, virtualization of the physical servers or hosts in the storage network environment allows for the possibility of running multiple operating systems and applications on the same physical server at the same time e.g. a single VMware ESX server may by "virtualized" into 1, 2, 4, 8, or more virtual servers, each running their own operating systems, and each able to support one or more applications. This virtualization of the servers may be enabled using software such as VMWare e.g. VMware ESX, which allows the virtualization of hardware resources on a computer-including the processor, memory, hard disk and network controller to create a virtual server with an independent operating system.

In many storage network environments with VMs, however, there may be congestion and bottlenecks because the VMs or virtual servers share the same file system in the SAN. As the number of VMs and other components in the network increase, congestions and bottlenecks are more likely to occur. In particular, performance problems occur when two virtual servers write a large amount of data to a physical storage device and then try to access that data or other data from the physical storage device at a later time. If the storage I/O (input-output) load is high for this storage device, the VMs compete for storage device resources. As a result the VMs can be slowed down dramatically. This, in turn, results in decreased network efficiency, as it takes a long time for the storage devices to handle I/O requests from the VMs.

Currently, there are no adequate technological solutions to assist SAN administrators in managing storage I/O load for storage devices associated with virtual machines in a virtual server environment. Current storage I/O load balancing methods focus on balancing loads by moving VMs to different physical servers. In addition, current storage I/O solutions rely on host agents in hosts or physical servers that contain virtual servers (hosts that have been "virtualized") within the SAN to collect a partial set of information from these virtual servers. A host agent is generally a piece of software executed on a computer processor. A host agent resides on the physical server or host and provides information about the host to devices external to the host. Using this partial set of information, SAN administrators then rely on manual methods e.g. manual spreadsheet based information entry, trial and error, etc., to manage change events in the virtualized storage network environment. However, host agents on a physical server are very difficult to manage and/or maintain, and are widely considered undesirable for large SANs in which scalability may be important. Thus, current methods do not resolve storage device bottlenecks because moving VMs to different physical servers may not necessarily change how these VMs access data on a physical storage device. Moreover, there are no solutions which consider the end-to-end service levels of applications, the end-to-end access paths for data flow, and the tier levels of resources and combination of storage and other network resources. Accordingly, there is a need present in the field for automatic storage resource load balancing among virtual machines (VMs) in virtual server environments.

BRIEF SUMMARY OF THE INVENTION

The systems and methods described herein include, among other things, processes for periodically analyzing and connecting storage load imbalances in a storage network environment including virtual machines. The systems and methods presented include collecting, analyzing, and balancing traffic and storage loads in each part of a virtual server network. These methods and systems account for various resource types, logical access paths, and relationships among different storage environment components. Load balancing may be managed in terms of input/output (I/O) traffic and storage utilization. The aggregated information is stored in one or more memory devices, and may be used to identify and correct load imbalances in a virtual server environment in order to prevent primary congestion and bottlenecks.

As used herein, an access path or a logical access path encompasses a logical channel between a given application residing on a virtual server and a given data object, e.g. LUN, along which data may flow. In other words, a logical access path is typically, although not exclusively, a sequence of components starting with a specific application on a specific virtual server via, for example, an HBA, and a sequence of one or more switches and physical links leading to a storage controller and a storage device containing a data object e.g. a LUN. The logical or configuration state of each component along the way in that sequence, for example, the virtual server, the HBA, the storage controller, or the switches, is set such as to not disable data flow between that specific application residing on a virtual server and that specific data object along that specific sequence.

In one aspect, the invention relates to a method for analyzing and correcting a storage load imbalance in a storage network environment with virtual machines. The method includes the steps of collecting information from components in the storage network environment. The components may include at least one of a switch, a network card, an application, a storage device, a data object, a LUN, a physical server, and two or more virtual machines. The information collected includes state and connectivity information for these components. The method includes deriving one or more access paths in the network environment and analyzing input-output (I/O) traffic along these access paths.

Each access path is representative of an end-to-end relationship between applications on a virtual machine and an associated data object or storage device in the storage network environment. In some embodiments, deriving an access path includes periodically determining a sequence of components starting with an application on a virtual server, a sequence of one or more switches and physical communication links leading to a storage controller, and a storage device containing a data object that is associated with the virtual server, collecting one of logical and configuration information for the sequence of components, determining if the sequence of components is configured for data flow along the sequence of components, and if the sequence of components is configured for data flow, storing the sequence of components and the collected information, thereby deriving an access path.

In one embodiment, the method includes generating an I/O ranking of the two or more virtual machines based on the I/O traffic between the virtual machines and storage devices associated with the virtual machines, and collecting performance information from storage devices including I/O requests from the associated storage devices which are not available at an array cache and/or I/O requests the storage devices are capable of producing. In another embodiment, the method includes computing storage utilization for the storage devices as a function of the collected performance information and generating a storage utilization ranking of the storage devices based on the collected storage utilization.

In some embodiments, the storage load imbalance is corrected by identifying a first virtual machine from the virtual machines with a high I/O ranking associated with a first data object that is associated with a first storage device with a high storage utilization ranking, wherein the first data object comprises at least one of a volume, a datastore and a file system, identifying a second data object that is associated with a second storage device with a low storage utilization ranking, wherein the second data object comprises at least one of a volume, a datastore and a file system, and moving the first virtual machine to associate with the second data object. In some embodiments, moving a virtual machine comprises copying the virtual machine from a first virtual cluster to a second virtual cluster, deleting the virtual machine from the first virtual cluster, and reconfiguring the second virtual cluster.

In an embodiment, high ranking I/O traffic loads comprise I/O loads above a pre-specified threshold. In another embodiment, high ranking storage utilization comprises utilization levels above a pre-specified threshold and low ranking storage utilization comprises utilization levels below a pre-specified threshold. In some embodiments, storage utilization is computed as the ratio of the amount of total I/O requests from a virtual machine provided by a physical storage device which are unavailable at the array cache to the storage capability of the physical storage device.

In another aspect, the invention relates to a computer program product that analyzes and corrects a storage load imbalance in a storage network environment with virtual machines. This computer program product comprises computer code that collects information from sources in the storage network environment, derives one or more access paths in the storage network environment and analyzing I/O traffic along these access paths, generates an I/O ranking of the virtual machines based on the I/O traffic between the virtual machines and storage devices associated with the virtual machines, collects performance information from storage devices, including I/O requests from said storage devices which are not available at an array cache and I/O requests the storage devices are capable of producing, computes storage utilization for the storage devices as a function of the collected performance information, generates a storage utilization ranking of the storage devices based on the collected storage utilization, and collects performance information from storage devices, including I/O requests from said storage devices which are not available at an array cache and/or I/O requests the storage devices are capable of producing.

In some embodiments, the computer program product further includes computer code that identifies a first virtual machine from the virtual machines with a high I/O ranking associated with a first data object that is associated with a first storage device having a high storage utilization ranking, identifies a second data object that is associated with a second storage device having a low storage utilization ranking, and moves the first virtual machine to associate with the second data object, thereby correcting the storage load imbalance.

In some embodiments, the components include at least one of a switch, a network card, an application, a storage device, a LUN, a data object, a physical server, and two or more virtual machines, and wherein the information includes state and connectivity information. In some embodiments, an access path is representative of an end-to-end relationship between applications on a virtual machine and an associated data object and/or storage device in the storage network environment. In certain embodiments, the first data object comprises at least one of a volume, a datastore and a file system, and the second data object comprises at least one of a volume, a datastore and a file system.

In an embodiment, the computer program product includes computer code that periodically determines a sequence of components starting with an application on a virtual server, a sequence of one or more switches and physical communication links leading to a storage controller, and a storage device containing a data object that is associated with the virtual server, computer code that collects one of logical and configuration information for the sequence of components, computer code that determines if the sequence of components is configured for data flow along the sequence of components, and computer code that stores the sequence of components and the collected information, thereby deriving an access path if the sequence of components is configured for data flow.

In another aspect, the invention relates to a system for analyzing and correcting a storage load imbalance in a storage network environment with virtual machines. The system comprises a user interface for allowing a user to assist in analyzing and correcting storage load imbalances in the storage network environment, a display for displaying information related to the storage network environment, a memory for storing information related to the storage network environment, and a processor in communication with the memory, the display, and the user interface.

In one embodiment, the processor is configured to correct the storage load imbalance by collecting information from sources in the storage network environment, deriving one or more access paths in the network environment and analyzing I/O traffic along these access paths, generating an I/O ranking of the virtual machines based on the I/O traffic between the virtual machines and storage devices associated with the virtual machines, collecting performance information from storage devices, including I/O requests from said storage devices which are not available at an array cache, computing storage utilization for the storage devices as a function of the collected performance information, generating a storage utilization ranking of the storage devices based on the collected storage utilization, identifying a first virtual machine from the virtual machines with a high I/O ranking associated with a first data object that is associated with a first storage device having a high storage utilization ranking, identifying a second data object that is associated with a second storage device having a low storage utilization ranking, and moving the first virtual machine to associate with the second data object.

In another aspect, the invention relates to a method for correcting a storage load imbalance in a storage network environment with virtual machines. The method comprises the steps of deriving access paths from the information collected from sources in the storage network environment, wherein an access path is representative of an end-to-end relationship between applications on virtual machines and storage components associated with the virtual machines in the network environment, storing the access paths on a memory device, generating a storage utilization ranking of two or more storage devices in the network environment, and storing the ranking on the memory device. In one embodiment, the storage load imbalance is corrected by including the steps of identifying and moving a first virtual machine from the virtual machines associated with a first storage device that is associated having a high storage utilization ranking to a second data object that is associated with a second storage device having a low storage utilization ranking. Identifying includes storing a first association of the first virtual machine with the first storage device in the memory device, while moving includes deleting the first association from the memory device and storing a second association of the first virtual machine with the second storage device in the memory device.

In one embodiment, the components may include at least one of a switch, a network card, an application, a storage device, a data object, a LUN, a physical server, and two or more virtual machines. In an embodiment, the information collected includes state and connectivity information for these components. In another embodiment, the first data object comprises at least one of a volume, a datastore and a file system. In some embodiments, the second data object comprises at least one of a volume, a datastore and a file system. In another embodiment, the method further includes providing a notification message including the first virtual machine.

In some embodiments, moving the first virtual machine comprises deleting the first virtual machine from the first virtual cluster and reconfiguring the second virtual cluster. In these embodiments, deleting includes removing a first association of the first virtual machine and first storage device from the memory device, and reconfiguring includes storing a second association of the first virtual machine and the second storage device in the memory device. In some embodiments, deriving an access path includes periodically determining a sequence of components starting with an application on a virtual server, a sequence of one or more switches and physical communication links leading to a storage controller, and a storage device containing a data object that is associated with the virtual server, collecting one of logical and configuration information for the sequence of components, determining if the sequence of components is configured for data flow along the sequence of components, and if the sequence of components is configured for data flow, storing the sequence of components and the collected information, thereby deriving an access path.

In this application, embodiments will be described in reference to storage area networks or storage network environments. It is to be understood that the systems and methods discussed herein are applicable to other environments, e.g., any suitable storage area network (SAN), tiered storage, hierarchical storage management (HSM), direct attached storage (DAS), network attached storage (NAS) environment, or any combination thereof.

BRIEF DESCRIPTION OF THE DRAWINGS

The above and other aspects and advantages of the embodiments will be apparent upon consideration of the following detailed description, taken in conjunction with the accompanying drawings, in which like reference characters refer to like parts throughout, which may not be drawn to scale, and in which:

FIG. 6 is an exemplary display of traffic and state information associated with virtual hosts in the virtual server network according to an illustrative embodiment;

FIG. 8 is an exemplary display of storage utilization data associated with virtual machines and storage components in the virtual server network.

DETAILED DESCRIPTION OF THE INVENTION

The systems and methods, in various embodiments, provide, among other things, processes for resource load balancing among virtual machines in virtual server environments. Although the invention is described below with reference to a Virtual Server Network, the description does not limit the invention, and the various embodiments set out below and depicted in the figures are merely provided for the purposes of illustrating certain embodiments of these systems and methods and for describing examples of such systems and methods. It will be apparent to those of skill in the art that the systems and methods described herein may, in certain forms, be employed in other types of storage infrastructure environments or any other networks for which access paths are defined and monitored. Thus, the scope of the invention is at least the scope defined by the appended claims and equivalents.

Figure 1:
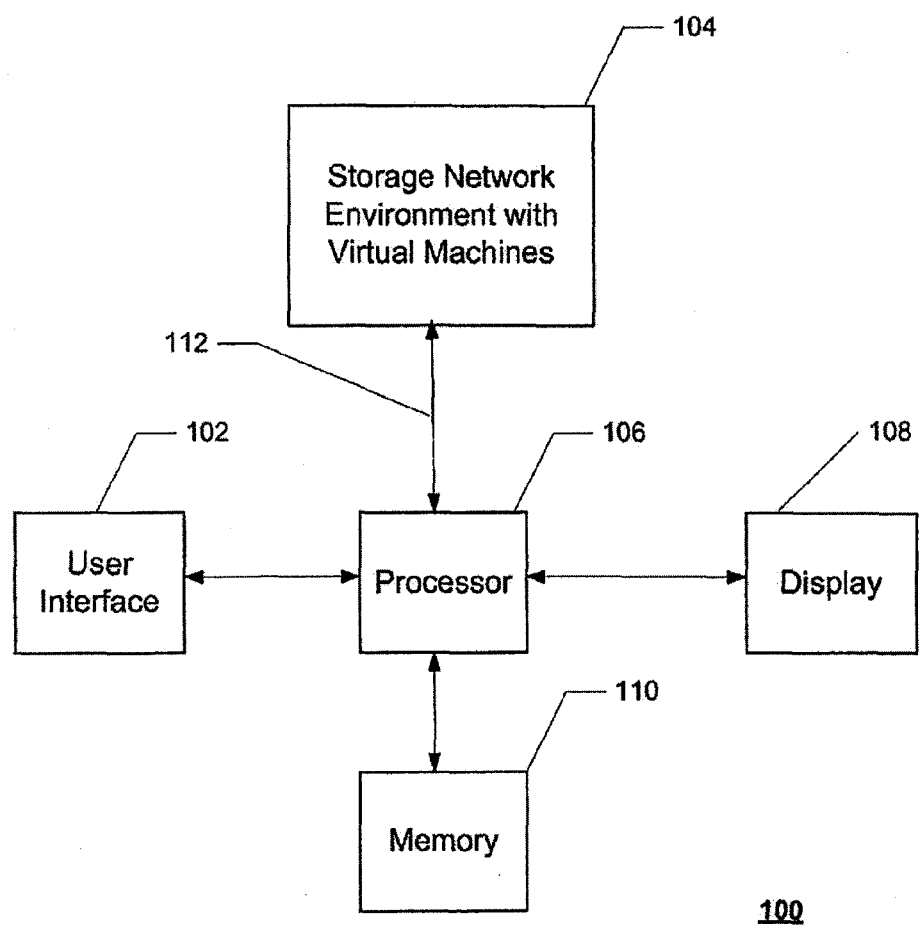
FIG. 1 shows a block diagram of a system for analyzing and balancing the data traffic loads among virtual machines in a storage network environment in which the present invention's teachings may be implemented.

FIG. 1 shows a block diagram of a system 100 for analyzing and balancing the data traffic loads among virtual machines in a storage network environment 104. System 100 includes a processor 106, a display 108, a memory 110, e.g., Random-Access Memory (RAM), a user interface 102, and a storage network infrastructure with virtual machines 104. Similar storage network environments with virtual machines are described in commonly-owned U.S. patent application Ser. No. 12/283,163, the contents of which are incorporated herein in their entirety. Processor 106 operates on information received from components in the storage network environment 104 in accordance with executable instructions or a computer program product loaded into memory 110. The instructions or computer code will ordinarily have been loaded into the memory from local persistent storage, e.g., a disc drive with which the memory communicates. The instructions may additionally or instead be received by way of user interface 102.

Memory 110 may be a persistent storage such as a hard drive or flash memory. The processor 106 may store intermediate results of computations and analyses of the storage network environment 104 on memory 110. As discussed below in relation to FIG. 2, this memory device may be located within the VMMP 280, within the SMP 220, or located in some combination thereof.

System 100 displays the processed information on display 108. Display 108 may be any display device capable of interfacing with processor 106, e.g., an LCD display or a CRT monitor. One or more human users may interact with display 108 via user interface 102. For instance, system 100 could receive user input via user interface 102 from devices such as a mouse and a keyboard. The user input could also originate from devices connected to user interface 102 remotely, e.g., via a network connection.

System 100 can be used to implement a method for storage resources load balancing among virtual machines in virtual server environments. Processor 106 in system 100 is configured to operate and execute instructions based on information 112 from the storage network with virtual machines 104. In particular, processor 106 may be configured to communicate with storage network 104 to collect information from sources in the storage network environment and derive access paths in the network environment as will be described below in reference to FIGS. 5, 6 and 7. Processor 106 is configured to analyze the I/O traffic from virtual machines along the derived access paths. Processor 106 may comprise one or more computer processors. For instance processor 106 may comprise a first processor for collecting information from sources in the storage network environment and deriving access paths in the network environment. Processor 106 may also comprise a second processor for analyzing the I/O traffic from virtual machines along the derived access paths. Processor 106 may include a third computer processor for interfacing with one or more components in storage network environment. Optionally, processor 106 may include a fourth computer processor for interacting with the virtual machines in the environment.

An access path may encompass a logical channel between an application, on a virtual machine or server, and a data object, e.g., a Logical Unit Number (LUN), along which data may flow. An access path may include a sequence of components including, but not limited to, a specific application on a virtual machine or on a physical server, a Host Bus Adapter (HBA), one or more switches, physical links, a storage controller, and a storage device. Some of the components of the access path are physical, for example, a physical server, an HBA, a storage device, network switch. Some components of the access path, e.g., the logical or configuration state of each component in the access path are data that is obtained from the physical components. The logical or configuration state of each component along the way in that sequence, for example, the HBA, the storage controller, or the switches, is set such as to not disable data flow between the specific application on the virtual machine and the specific data object along the specific sequence.

Processor 106 of FIG. 1 is further configured to generate an I/O ranking of the virtual machines according to the traffic load a virtual machine generates. This I/O traffic load may be caused, in part, by read/write data sent via access paths associated with the virtual machine. Processor 106 is also configured to collect performance information from storage components in the storage network environment including, but not limited to, storage extent and storage capabilities. Storage extent may be understood as the amount of total I/O requests provided by the physical storage component which are not available at the array cache. An array cache is a memory device that is in communication with the physical storage components and stores data temporarily such that the array cache acts as a buffer for each of the physical storage components. Thus, I/O requests may be satisfied by reading data from an array cache instead of a physical storage component. Storage network environments may have one or more array caches. Storage capabilities can be understood as the total amount of I/O requests the storage component is capable of producing. Both storage extent and storage capabilities are calculated taking into consideration all other storage affecting the storage component in other virtual server or physical server environments. In certain embodiments the performance information is saved in memory 110. The processor 106 is configured to compute levels of storage utilization based on the performance information, and generate a storage utilization ranking of the storage components based on the computed storage utilization levels. In certain embodiments storage utilization is computed by the processor 106 as storage extent divided by storage capabilities. The computed levels of storage utilization and storage extent are stored in a memory device, e.g., persistent storage such as a hard drive or flash memory. As discussed below in relation to FIG. 2, this memory device may be located within the VMMP 280, within the SMP 220, or located in some combination thereof.

Processor 106 is also configured to identify a virtual machine with a high I/O ranking associated with a storage component with a high storage utilization ranking, as well as a storage component with a low storage utilization ranking. The processor 106 is configured to move virtual machines with an I/O ranking above a pre-specified threshold from one data object to another such that the virtual machine doesn't access the identified storage component with the storage utilization ranking above a pre-specified threshold, and instead accesses the identified storage component with storage utilization ranking below a pre-specified threshold. For example, this pre-specified threshold could be 40% utilization. The virtual machines may also be moved without the use of thresholds, e.g. at a user's discretion or based on other instructions send to the processor. In this manner, storage resource loads are balanced among the storage components, e.g. physical storage devices. Additionally, an alert or notification may be created when the I/O ranking or storage utilization ranking is above a specified threshold, so that a user (i.e. ESX manager) may determine if one or more VMs should be moved to different data objects. The threshold for VM I/O ranking may be based on the level of I/O traffic from a VM. For example, the threshold may be set at 20 requests per minute and when the I/O ranking exceeds this threshold, balancing action may be taken. Similarly, the threshold for storage utilization ranking may be set at a particular level of storage utilization. For example, the threshold may be set at 90% storage utilization and when the storage utilization ranking exceeds this threshold, load balancing action may be taken. Optionally, a user, e.g., a storage network environment or VM administrator, interacting with system 100 could be notified of a load imbalance in the network and may decide on whether or not to take corrective action.

In certain embodiments, processor 106 is configured to display notification messages on display 108 of system 100 indicating the I/O rankings of virtual machines and the storage utilization rankings of storage components. A user may interact with user interface 102 to control the movement of virtual machines and/or data objects associated with virtual machines such that these virtual machines access the appropriate storage components, thereby balancing load resources in the virtual server environment.

Figure 2:
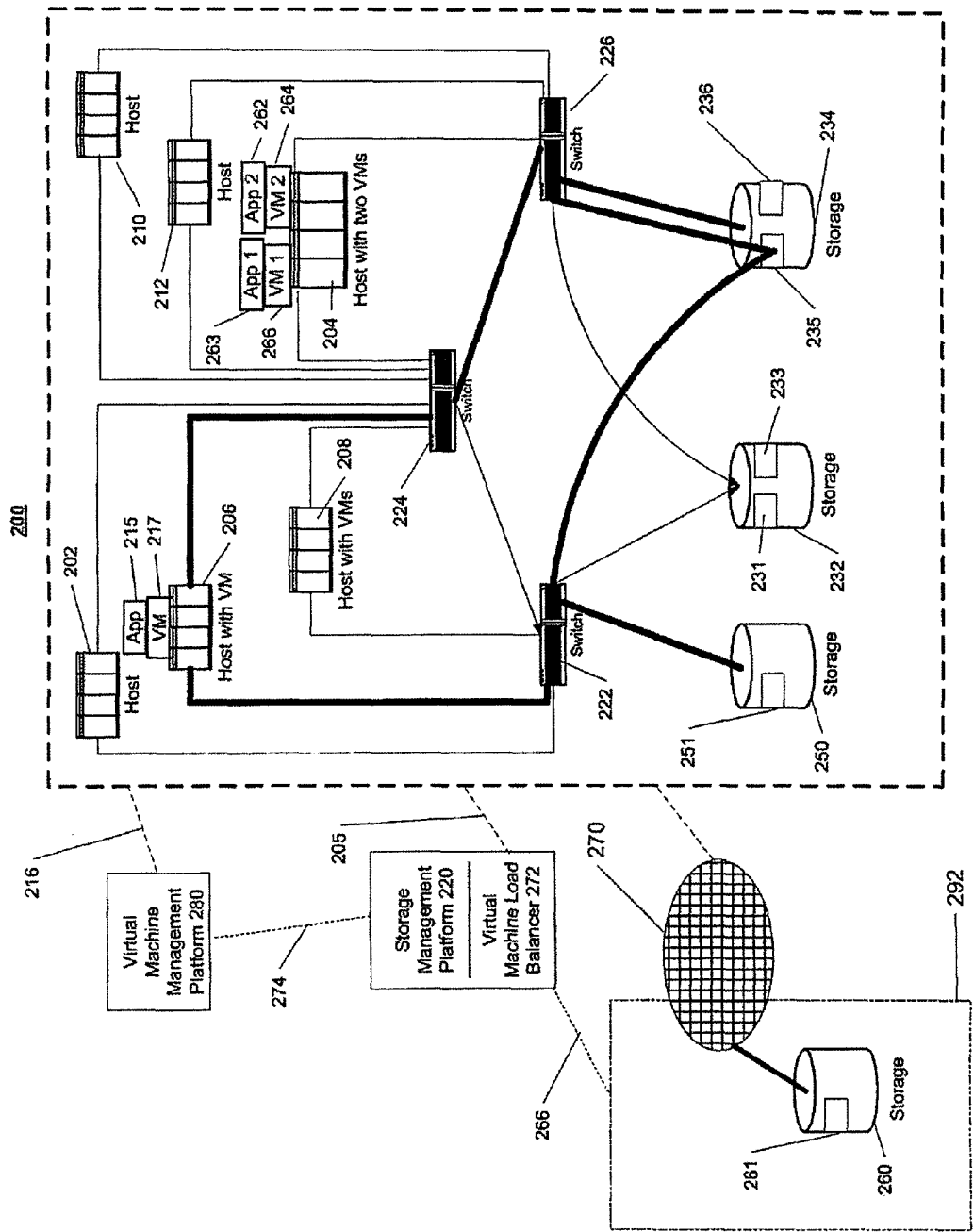
FIG. 2 shows a topological view of an exemplary storage network environment infrastructure containing one or more virtual machines or virtual servers, according to an illustrative embodiment.

FIG. 2 shows a topological view of an exemplary storage network environment, SAN 200, according to an illustrative embodiment. In some embodiments, the storage network environment could be a network attached storage (NAS), a distributed storage architecture, a hybrid storage architecture with one or more SANs, one or more NASs, and DASs, or any other suitable storage network environment. In a distributed storage architecture, e.g., one having a modular structure, the physical servers, data storage components, array cache, LUNs, etc, would be partitioned into two or more partitions such that the storage network environment would comprise two or more subnetworks.

In the embodiment shown in FIG. 2, SAN 200 includes hosts (such as 202, 204, 206, 208, 210 and 212), virtual machines or virtual servers associated with physical servers or hosts (such as 217, 266, and 264), applications running on the virtual machines (such as 215, 260 and 262), switches (such as 222, 224 and 226), and data storage components or storage devices (such as 232, 234, 250, and 252). The storage devices or storage components may be, for example, disk drives, such as RAID devices, flash memory, tape drives, or other types of mass-storage devices.

Storage devices 232, 234, 250, and 252, each illustrated as a single unit in FIG. 2 may have a distributed architecture. For example, the storage device 250 may be implemented with multiple distributed storage servers. It can also include a physically separate network module (e.g., "N-module") and disk module (e.g., "D-module") (not shown in FIG. 2), which communicate with other storage devices in the storage network environment over an external interconnect. The N-module acts as a front-end of the storage device, exporting services to clients; and the D-module acts as the back-end, managing the underlying storage of the storage device. The N-module and D-module can be contained in separate housings and communicate with each other via network connections. Thus, the N-module and the D-module enable a storage device to be physically separated into multiple modules that can be distributed across the storage network environment. It should be noted that there may be different number of N- and D-modules (not shown in FIG. 2) in accordance with various illustrative embodiments. For example, there may be a number of N-modules and D-modules interconnected in a cluster configuration that does not reflect a one-to-one correspondence between the N- and D-modules.

The virtual machines or virtual servers (such as 217, 266, and 264) are able to support their own operating system and applications, and have all the same "virtual" components that are found in a typical x86 computer e.g. a motherboard, a graphics card, a network card, a network card controller, memory, etc. Thus, a virtual server can operate as the equivalent of a physical server. This type of virtualization of the physical server may be enabled in hardware or in software, as will be described below.

Storage components or storage devices may contain allocations for the virtual machine servers (or virtual servers, or virtual machines) e.g. 231, 233, 235, and 236, which are stored, sometimes with data objects or data stores e.g. LUNs, on the storage devices. Applications execute on hosts, for example application 215 on host 206, and require read and write access to certain volumes on storage devices. SAN 200 could include multiple storage network environment segments, e.g., segments 292 and 270. Some of these storage network environment segments may include virtual machines or virtual servers, e.g., segment 292, while others may not include virtual machines or virtual servers, e.g., segment 270.

SAN 200 in FIG. 2 also includes a virtual machine load balancer 272, part of a Storage Management Platform (SMP) 220, which interacts with the storage network environment components and performs analysis and management tasks. This virtual machine load balancer 272 may be implemented on a general purpose system, e.g., system 100 of FIG. 1, or as a computer-executable medium storing computer-executable instructions allowing for interaction with the storage network environment components. Virtual machine load balancer can be external to, internal to or integrated with SAN 200. SMP 220 and virtual machine load balancer 272 may be implemented on a general purpose system, e.g., system 100 of FIG. 1, or as a computer-executable medium storing computer-executable instructions allowing for interaction with the storage network environment components and Virtual Machine Management Platform (VMMP) 280. For instance, SMP 220 may include some storage network environment monitoring hardware and software e.g. NetApp's SANScreen which interfaces with the two storage network environments via paths 205 and 266 respectively. This interface may not involve the use of host agents on the physical servers or hosts. As mentioned above, a host agent is typically a piece of software that is executed on a computer processor. A host agent resides on a physical host and provides information to devices external to the host. The SMP and the virtual load balancer 272 may also interact with VMMP 280 via path 274, as disclosed in commonly-assigned U.S. patent application Ser. No. 12/283,163 filed on Sep. 9, 2008, the contents of which are incorporated herein in their entirety. This interaction may not involve the use of host agents on the physical servers or hosts. VMMP 280 may be implemented on a general purpose system, e.g., system 100 of FIG. 1, or as a computer-executable medium or computer program product storing computer-executable instructions or computer code allowing for interaction with the storage network environment components and SMP 220. For instance, the virtual servers in the storage network environment may share their state and configuration information with VMMP 280, which in turn shares this information, either voluntarily or via periodic requests (e.g. every 1 or 2 minutes), with SMP 220 and virtual machine load balancer 272. This information may be shared on a periodic basis, e.g. every 2 minutes, or more frequently. The shared information is stored in a memory device, e.g., persistent storage such as a hard drive or flash memory, within the VMMP 280, a memory device within the SMP 220, or a combination thereof.

VMMP 280 may include some virtualization software e.g. computer program product VMware ESX or VMware virtual management center which interfaces with the virtual machines in the storage network environment via path 216. Such software or computer code, when running on the physical servers e.g. ESX servers, enables virtualization by allocating hardware resources dynamically such that the applications running on the virtual servers are unaware of the virtualization that has been enabled. In addition, such software or computer code may interface with SMP 220 to provide the SMP with information about the virtual servers.

VMMP 280 may provide information on the number and location of the physical servers, the number and location of the virtual servers, the number and location of the data stores or data objects associated with these virtual servers, the state of a virtual server e.g. a virtual machine is powered on or off, or the characteristics of the data traffic flow through the virtual server. In this manner, virtual machine load balancer 272 may communicate periodically with each storage network environment component and with VMPP 280 (thereby communicating with the virtual servers), to obtain the current state configuration of the component and the characteristics of the data traffic that traversed through that component since the last periodic query, e.g., the amount of data transferred, on which ports, etc. Again, the information provided is stored in a memory device, e.g., persistent storage such as a hard drive or flash memory, within the VMMP 280, a memory device within the SMP 220, or a combination thereof.

Each storage network environment component in SAN 200 has a certain type which defines its category (e.g. disk storage device, virtual machine storage device, tape storage device, etc), its manufacturer (e.g. vendor name, such as EMC, IBM, NetApp, etc), its product name (e.g. Symmetries, Clarion, Shark, VMware, SnapShot, etc)., and its model number (e.g. its version, add-ons, etc).

Each storage network component e.g. a virtual machine 266 on host 204, or switch 222, or host 210, or application 260, in SAN 200 also has an internal state. The internal state of each storage network environment component at each point of time contains values for various execution state variables (such as for example amount of data that flowed through a certain port in a recent interval, or the data stored at a particular location) as well as configuration state variables (such as which ports are enabled, which other component is connected via each ports, what are the set transfer rates, which zones are defined, which are the members of each zone, etc). For example, for a data store or storage device, the state may include an indication of whether a corresponding virtual machine is powered on or powered off, whether a virtual machine in the storage network environment is able to utilize that data store, what the current or past storage space allocation to that virtual machine is, or an indication of which, if any, unused data stores or storage devices exist in the storage network environment. For a virtual machine or virtual server, the state may include an indication of whether that virtual machine is powered on or powered off, the central processing unit (CPU) utilization in that virtual machine, the memory utilization in that virtual machine, or the traffic flow through that virtual machine. Some of these state variables can be changed by a designated user e.g. a storage network environment or VM administrator, while others may be automatically set by the VMMP 280 in response to other changes in the storage network environment. Changes to execution state variables occur as a result of data flow related activities, whereas changes to the configuration state variables occur as a result of planned or unplanned configuration actions.

Each storage network component in SAN 200 may have multiple attributes associated with it that characterize various aspects of the functionality of that component. For example the attributes of a switch may include, among others, the maximum number of ports, the maximum data transfer rates, etc. The attributes of a virtual machine component may include, among others, the maximum storage capacity, the CPU utilization, the traffic flow, the memory utilization, the maximum rate of data reads or writes, the RAID level, etc. The value of some of these attributes can be obtained by querying the virtual machine component via VMMP 280, whereas the value of other values can be deduced from the component type (that is from the information about manufacturer, product, model, etc.). The attributes of the virtual servers or virtual machines may be obtained and stored by the VMMP 280 and then transferred to the SMP 220.

Access paths in SAN 200 and their related access characteristics are realized by setting up multiple underlying devices of different types. This set up may be carried out by a designated user or carried out automatically by the VMMP 280 and SMP 220. The access paths and their related access characteristics may be stored in a memory device, e.g., persistent storage such as a hard drive or flash memory, within the VMMP 280, a memory device within the SMP 220, or a combination thereof. These underlying operations include multiple physical and logical basic set up actions which need to be set up in different locations and device types and with mutual consistency, i.e., set up such that if data flow through the devices is enabled, the logical set up of each device allows for this data flow. In this respect, the end-points in storage network environment have data flows that generally possess a relatively strong exclusive access relationship, i.e., there is a well-defined (e.g. one-to-one) relationship between one end-point, e.g., an application on a virtual machine, and another end-point, e.g., a physical storage device, along which data must flow. That is, each application on a SAN-connected virtual server or physical server (the host) typically requires access, and often exclusive access, only to some specific storage network environment data objects (LUNs) on the storage devices. Consequently, in storage network environments each source end point, i.e., the applications on the virtual or physical server (host), will typically need to interact only, and often exclusively, with a specific, small number of target end points, e.g., the LUNs on the network storage devices. The virtual servers share their state and configuration information with the VMMP 280, which in turn shares this information with SMP 220 and virtual machine load balancer 272.

In some embodiments, storage performance bottlenecks are actively avoided, allowing for better utilization of resources. For instance, if two or more virtual machines with high I/O traffic loads are associated with the same storage component with high storage utilization, SMP 220 and VM load balancer 272 may interact to provide a notification of a competing storage resources to a storage network environment or VM administrator. This notification may be provided periodically, e.g., once every minute, hour, week, or month. SMP 220 and VM load balancer may also interact to automatically move virtual machines and/or data objects associated with one or more of the competing virtual machines to a storage component with lower storage utilization. This movement may be performed periodically e.g., once every minute, hour, week, or month.

Part of the internal configuration state of each component in SAN 200 contains information about the allocation of each virtual machine resource e.g. storage space, CPU, memory, or traffic load, or set of virtual machine resources, of that component for the exclusive use of one or more external entities, such as an application, a set of applications, other components, etc. For instance, state configuration information may include one or more of a virtual or physical server ID, a virtual or physical server port configuration, a switch port configuration, a switch ID, a switch IP and domain ID, a grouping of storage devices, a zoning of storage devices, a storage device ID, LUNs associated with storage devices, and LUN masks associated with storage devices.

Virtual machine resources of components in SAN 200 which are not allocated are considered available. For example, if 60% of the CPU of a virtual machine is allocated to a particular application, the remaining 40% is considered available to other applications accessible to that virtual machine. Allocated virtual machine resources at a component can be de-allocated and the internal configuration state updated accordingly, and afterwards they can be allocated again to particular applications or components. The allocation and de-allocation of resources may be performed by a designated user or by a combination one or both of VMMP 280 and SMP 220.

A virtual machine resource is allocated to an access path associated with a virtual machine e.g. storage volume 234 in SAN 200 if it is allocated either to an application running on a virtual server 215 or to a component which is part of that access path e.g. switch 222. A virtual machine resource is associated with an application if it is allocated to that application or to a component on an access path associated with that application.

For instance, in the exemplary embodiment in FIG. 2, with appropriate state configurations on storage environment components 224, 226, and 234, these components may form an access path between application 215 running on virtual server 217 on host 206 and the corresponding volume 235 on data storage device 234. Volume 251 may be a local replica of volume 235, while volume 261 may be a remote replica of volume 251, and so both of these are replica extensions of the access path between application 215 and volume 235. These configurations and access paths are stored in a memory device, e.g., persistent storage such as a hard drive or flash memory, within the VMMP 280, a memory device within the SMP 220, or a combination thereof.

In certain embodiments, to discover all the access paths associated with virtual machines or virtual servers in the storage network environment, compute their end-to-end attributes, and establish that they are consistent with the set access path policy requirements, information needs to be obtained from the different storage network environment components regarding their types, state, and connectivity. These aspects of access path awareness and discovery, among others, are described in commonly-assigned U.S. patent application Ser. Nos. 10/693,632, 11/529,748, and 11/965,392, the contents of which are hereby incorporated herein in their entirety.

Based on its access path attribute values e.g. a number of hops within a valid logical access path, a level of end-to-end redundancy for a valid logical access path, and a number of allocated ports for a valid logical access path, bandwidth, component interoperability, proximity constraints, and type of storage network environment component authentication, each storage network environment component, e.g., a virtual machine 217 on host 206 in SAN 200, can be classified to a tier level. The tier level of a storage environment component in a SAN e.g. SAN 200 represents a rank classification, relative to other components of the same type and category, of the level of storage service it can support in key storage service parameters (such as availability and performance).

For example a high performance storage device e.g. an EMC DMX or VMware ESX, with appropriate set-up can be classified as a Tier 1 component due to its superior data read/write rates attribute characteristics (performance), and its internal redundancy characteristics (availability), relative for example to mid-range storage devices e.g. EMC Clarion which has lower performance and availability characteristics and can be classified to a lower Tier (such as Tier 2).

Each storage environment component corresponds to a certain amount of virtual machine resources. Each such virtual machine resource can be allocated for an exclusive use by a single entity (such as a single application on a host) or by a set of entities (such as a number of applications on a number of hosts). The type of virtual machine resources which are associated with a component depend on the component type. For example the resources of storage devices include units of storage capacity i.e. data store or data object capacity, whereas resources of switches include the switch port utilizations.

Each storage network environment resource can also be classified to a tier level representative of the importance of that resource in the storage network environment. The tier level e.g. low (bronze), medium (silver), or high (gold), of a resource is determined by the tier of the component with which it is associated, as well as possibly by additional characteristics specific to that resource. For example the tier level of a volume of data stored on a storage device is determined by the tier level of the corresponding storage device, as well as the level and type of replication of that data volume on other storage devices.

The tier classification of components and resources represent a layer of abstraction of the storage environment representing normalization of service level across different components and components types in the environment. Such a normalized layer of abstraction is useful for gaining visibility into the end-to-end storage environment and managing and controlling, in an optimal manner, both the service levels provided to applications on one hand, and the amount of virtual machine and other resources (and costs) required to provide that level of service. The Virtual Machine Load balancer in the storage network environment, e.g., VM load balancer 272 of SAN 200 in FIG. 2, performs the process 400 depicted in FIG. 4 as described below.

System 100 of FIG. 1 may interact with virtual machine load balancer 272 to perform data traffic load analysis and management tasks. For instance, virtual machine load balancer 272 may be in communication with processor 106 of system 100 in FIG. 1, and may provide information about various aspects of the SAN 200 to the system 100. For instance, virtual machine load balancer 272 may provide information on the data traffic flows and instructions for virtual machine and/or data object movement associated with the logical access paths in SAN 200 to system 100 of FIG. 1.

Figure 3A:
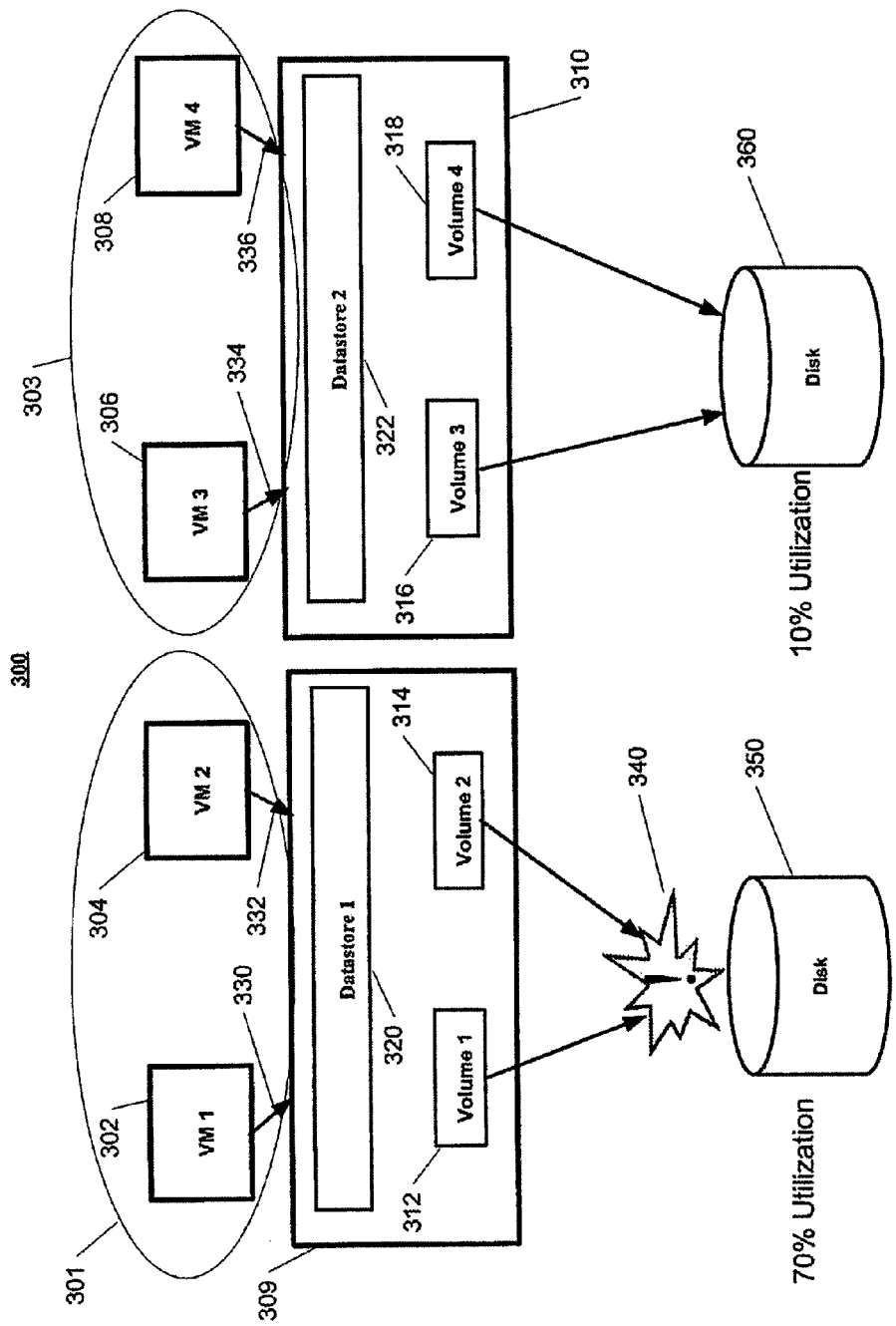
FIG. 3A shows a topological view of an exemplary virtual server environment with disk level congestion according to an illustrative embodiment.

FIG. 3A shows a topological view of an exemplary virtual server environment 300 with storage device level congestion. Such a network environment 300 may be part of SAN 200 in FIG. 2. As shown in FIG. 3A, virtual server environment 300 includes virtual machines 302, 304, 306, and 308. Virtual machines 302 and 304 are part of virtual cluster 301, while virtual machines 306 and 308 are part of virtual cluster 303. A virtual cluster is a set of virtual machines that are located on the same physical server or host. For instance, virtual cluster 301 is on a first physical server or host, while virtual cluster 303 is located on a second, different physical server or host. Virtual server environment 300 also includes file systems 309 and 310 made up of datastore 1 320 and datastore 2 322, and volumes 312, 314, 316, and 318. The access paths 330 and 332 of VMs 302 and 304, respectively, both lead through file system 309 to storage device 350. As a result of both VMs 302 and 304 trying to store data on storage device 350, primary congestion and storage device bottlenecks 340 may occur. For instance, storage device 350 may have a 90% storage utilization. This in turn can lead to high storage I/O load as VMs 302 and 304 compete for storage device resources 350, and as a result, both VMs 302 and 304 can be slowed down dramatically. VMs 306 and 308 access storage device 360 via access paths 334 and 336, respectively. Access paths 334 and 336 also pass through file system 310, and volumes 316 and 318. In this exemplary virtual server environment 300, the storage utilization for storage device 360 is 10% and there is no congestion and/or storage device bottlenecks when VMs 306 and 308 access storage device 360.

Congestion and/or bottlenecks 340 may need to be resolved in order to improve the efficiency in accessing data stored in storage device 350. Current load balancing methods, e.g., VMWares's DRS, focus on balancing VM traffic load by redistributing the VMs across different physical servers. However, that technique does not effectively resolve a storage device bottleneck because the redistributed VMs still access the same datastores, and in turn, the same over-utilized storage device.

The systems and methods described herein resolve storage device bottlenecks and/or congestion by moving VMs from one data object to another, e.g., by moving either VM 302 or VM 304 from datastore 1 320 to datastore 2 322, as will be explained in reference to FIGS. 3B and 3C.

Figure 3B:
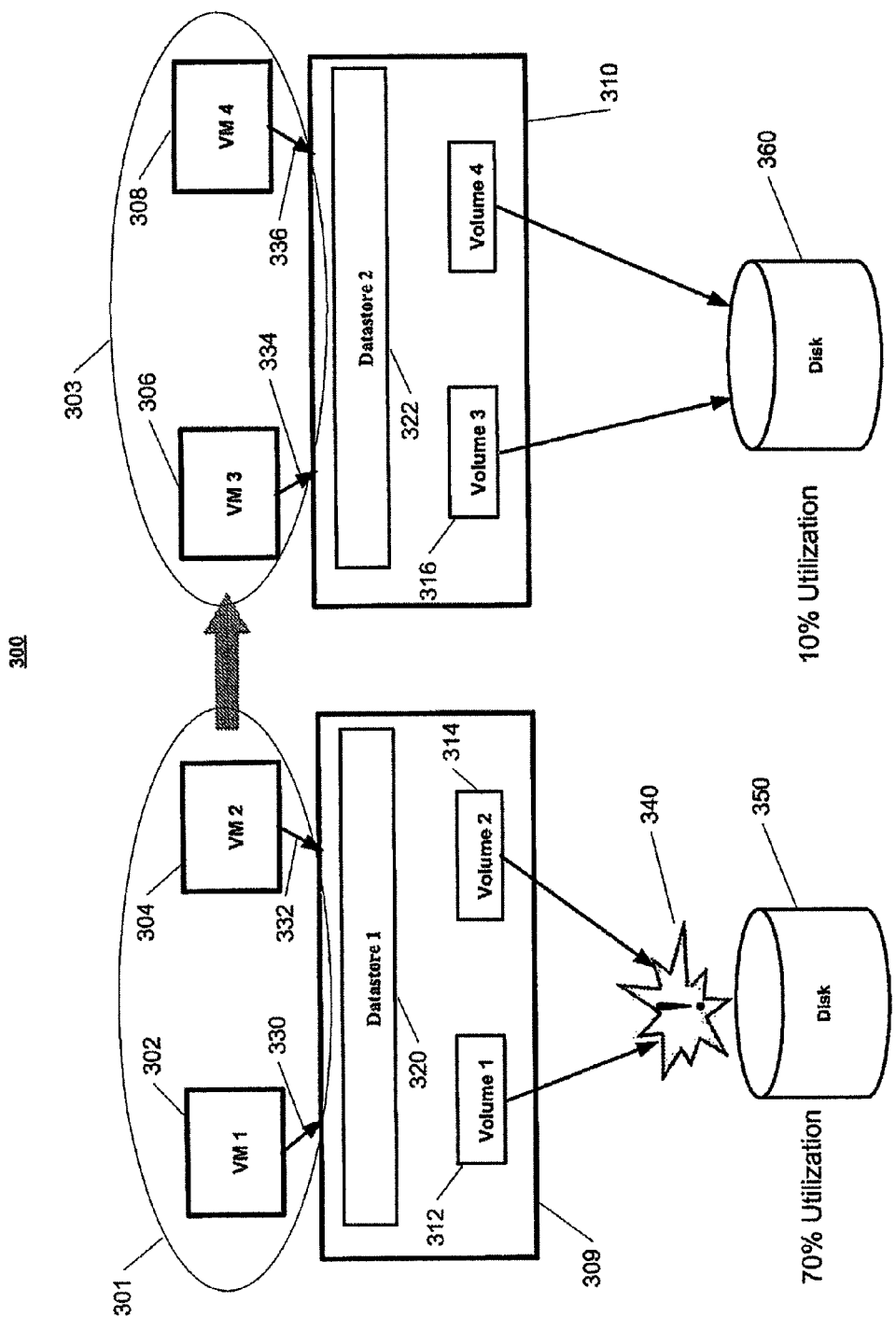
FIG. 3B shows a topological view of an exemplary first step of a process for eliminating disk level congestion according to an illustrative embodiment.
Figure 3C:
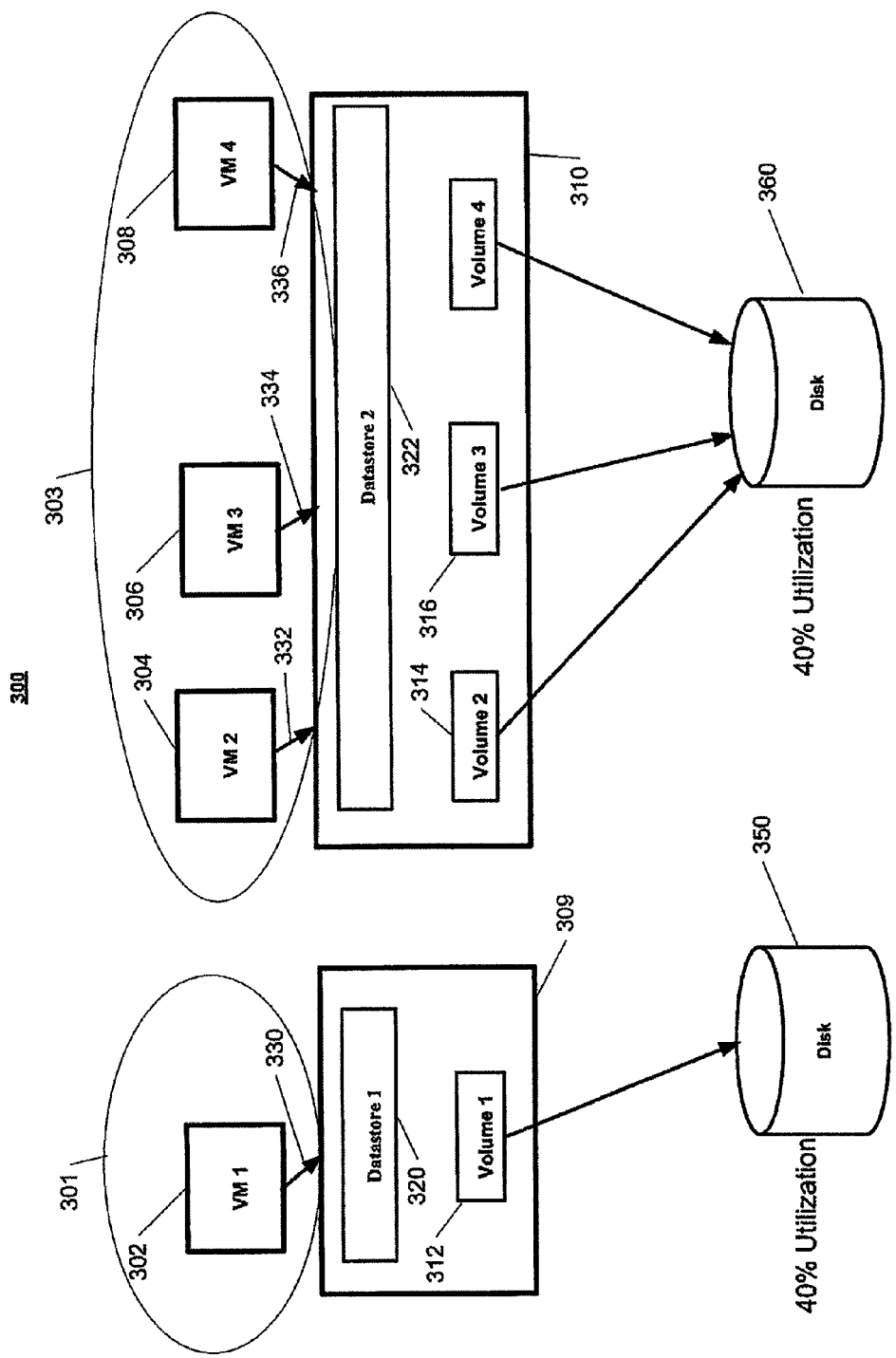
FIG. 3C shows a topological view of an exemplary second step of a process for eliminating disk level congestion according to an illustrative embodiment.

FIGS. 3B and 3C shows a topological view of an exemplary process for eliminating storage device level congestion in the exemplary virtual server environment 300 described in FIG. 3A. In FIG. 3B, VMs 302 and 304 are each analyzed in terms of how much each of these two VMs contribute to the 90% storage utilization of storage device 350. The results of this analysis are stored in a memory device, e.g., persistent storage such as a hard drive or flash memory, within the VMMP 280, a memory device within the SMP 220, or a combination thereof. In this analysis, it may be determined that VM 304 contributes to the storage utilization of storage device 350 much more than VM 302, and hence VM 304 has a higher I/O ranking than VM 302. The I/O requests from VM 304 that contribute to the storage utilization of storage device 350 may be above a pre-determined threshold e.g., VM 304 may contribute 30% to the storage utilization of storage device 350, and the pre-determined threshold may be 20%. This threshold may be set by a storage network environment or VM administrator interacting with system 100 of FIG. 1. This analysis of contribution to storage utilization in a storage device in a virtual server environment may also be referred to as storage extent, i.e., the extent to which each VM in a VM cluster is utilizing a storage device. The storage extent thus found may also be stored in a memory device, e.g., persistent storage such as a hard drive or flash memory, within the VMMP 280, a memory device within the SMP 220, or a combination thereof.

FIG. 3C shows that storage device bottlenecks and/or congestion are avoided by moving VM 304 from virtual cluster 301 to virtual cluster 303 or, in other words, moving VM 304 from datastore 1 320 to datastore 2 322. Prior to moving VM 304, the current network configuration including, but not limited to, access paths that include virtual machines and storage components and/or datastores are stored in a memory device, e.g., persistent storage such as a hard drive or flash memory, within the VMMP 280, a memory device within the SMP 220, or a combination thereof. For instance, the associations of virtual machines and storage components and/or datastores may be stored in the memory device. The movement of VM 304 could be enabled automatically by, for example, VMMP 280 of FIG. 2, or by a user-generated command from a storage network environment administrator or a VM administrator. For instance, a VM administrator could use conventional VM management software, e.g. VMWare DRS to move VM 304 from virtual cluster 301 to virtual cluster 303. The software would copy VM 304 and recreate it in virtual cluster 303 and then proceed to delete VM 304 from virtual cluster 301. The effect of moving this VM to a different datastore is that the VM may now reside on a different physical server and/or have a different application running on the VM. In effect, the association of VM 304 with virtual cluster 301 and datastore 1 320 is deleted from the memory device, and an association of VM 304 with virtual cluster 303 and datastore 2 322 is stored in the memory device. Thus, the result of this movement is that the data objects e.g. volumes and file systems, associated with VM 304 are moved from file system 309 to file system 310. Another result of this movement is that VM 304 now accesses storage device 360 (and the array cache associated with storage device 360) instead of storage device 350 (and the array cache associated with storage device 350), and the storage utilization of storage devices 350 and 360 now each equal 40%. Moving the virtual machine 304 can be done using appropriate software, e.g. Storage VMotion using processor 106 of system 100, or other similar solutions. After moving VM 304, the new configuration of the virtual machines and datastores are stored in a memory device, e.g., persistent storage such as a hard drive or flash memory, within the VMMP 280, a memory device within the SMP 220, or a combination thereof.

Figure 4:
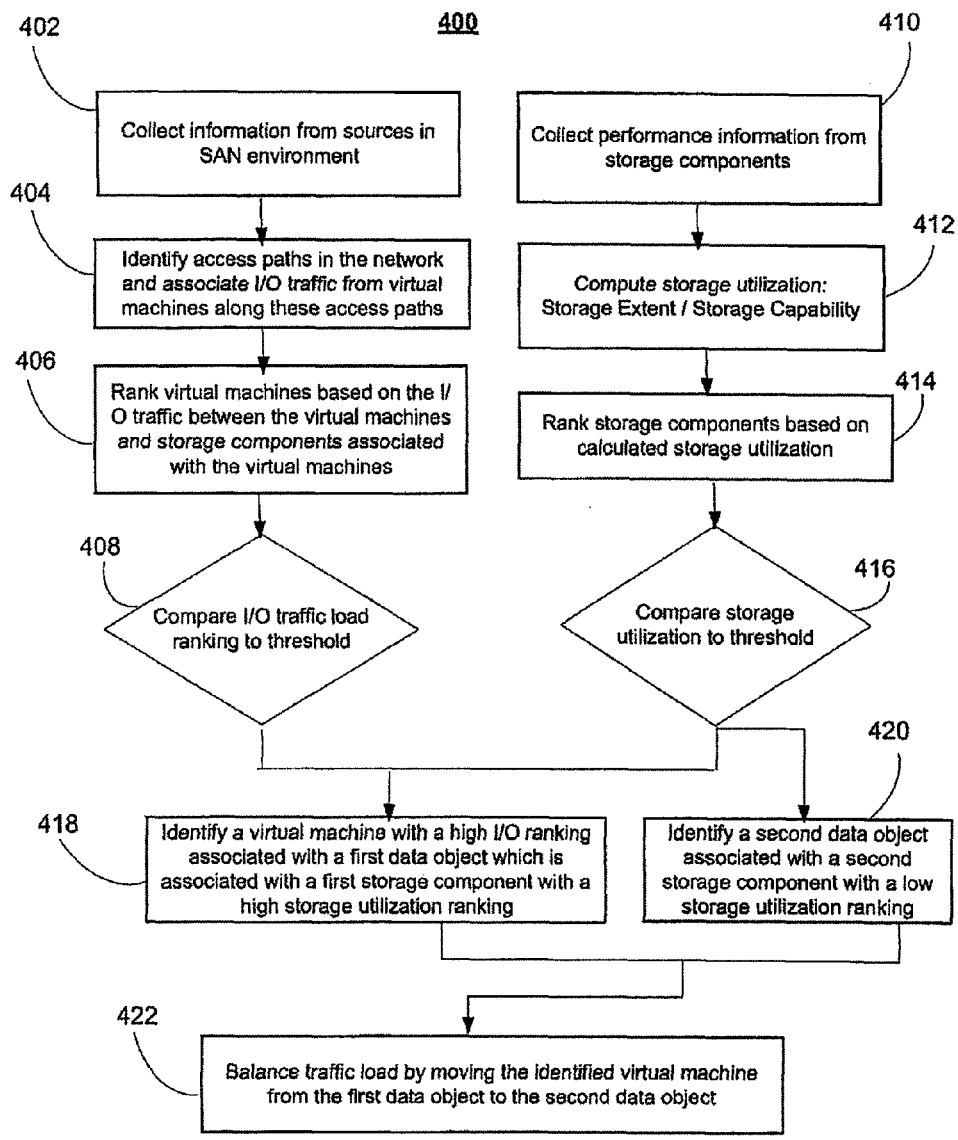
FIG. 4 shows a process flow for analyzing and balancing the data traffic loads associated with virtual machines in a storage network environment, according to an illustrative embodiment.

This process for analyzing and balancing the data traffic loads in a virtual server environment is described with respect to FIG. 4.

FIG. 4 shows a process flow for analyzing and balancing the data traffic loads associated with virtual machines in exemplary storage network environment 200. Processor 106 of system 100 may be configured to communicate with traffic load manager 272 in SAN 200 of FIG. 2 to carry out process 400 depicted in FIG. 4. For instance, processor 106 may periodically, e.g., every 2 minutes, request traffic load manager 272 in SAN 200 to send processor 106 information on components in the storage network environment 200. This information may be obtained without the use of host agents residing on the physical servers or hosts. Process 400 includes steps 402, 404, 406, 408, 410, 412, 414, 416, 418, 420, and 422. System 100 of FIG. 1 could interact with traffic load manager 272 of FIG. 2 to carry out steps 402 and 404 of process 400, namely to collect information from sources in the storage network environment and identify the logical access paths and I/O traffic from the associated virtual machines in the storage network 200 of FIG. 2.

In some embodiments, computing the associated access path attribute values involves constructing a graph representation of the network topology such that each node in the graph represents a device or component in the storage network environment, and each edge represents an information flow capability between two devices, wherein the information flow capability is determined by a physical communication link between the two devices and the logical state configurations on the two devices. These aspects of access path awareness and discovery, among others, are described in commonly-assigned U.S. patent application Ser. No. 10/693,632, the content of which is hereby incorporated herein in their entirety. Once the logical access paths and associated I/O traffic from virtual machines along these paths have been identified in step 404, the processor 106 in system 100 of FIG. 1 could interact with virtual machine load balancer 272 of FIG. 2 to carry out step 406 of process 400, namely to rank the virtual machines based on how much I/O traffic it generates. The I/O rankings of the virtual machines may be stored, for example, by processor 106 of FIG. 1 in memory 110. Note that memory 110 may be a memory device, e.g., persistent storage such as a hard drive or flash memory, within the VMMP 280, a memory device within the SMP 220, or a combination thereof. Optionally, steps 410, 412 and 414 are executed concurrently with step 402, 404, and 406. System 100 of FIG. 1 could interact with virtual machine load balancer 272 of FIG. 2 to carry out step 410 of process 400, namely to collect performance information from the storage components e.g. storage devices, volumes, file systems, and datastores.

The processor 106 of system 100 could also be used to carry out step 412, namely to compute storage utilization. Storage utilization can be understood as the ratio of the amount of total I/O requests from a VM provided by a physical storage device which are unavailable at the array cache (Storage Extent) to the storage capability of the physical storage device. Storage extent is essentially a measure of how busy a storage device is as a result of the requests from a particular VM. If I/O requests from a VM are available at the array cache, a temporary storage area for quick access to data, the requests do not contribute to the storage extent of the storage device. Thus storage extent is a measure of the amount of total I/O requests from a VM provided by a physical storage device which are unavailable at the array cache. Storage capability is defined as the total amount of I/O the physical storage device is capable of producing or processing. Once the storage utilization has been computed for the storage components in step 412, the processor 106 in system 100 of FIG. 1 could interact with virtual machine load balancer 272 of FIG. 2 to carry out step 414 of process 400, namely to rank the storage components based on their respective calculated storage utilization. The storage utilization rankings of the storage components may be stored, for example, by processor 106 in memory 110. Steps 408 and 416 of process 400 involve comparing the I/O traffic load ranking, created in step 406, and storage utilization ranking, created in step 414, to respective thresholds. According to one embodiment of the invention, the thresholds may be pre-set by a user e.g. a storage network environment or VM administrator through user interface 102 of system 100, or may be automatically set, e.g. by processor 106 in system 100.

Once I/O rankings and storage utilization rankings have been compared to their respective thresholds in steps 408 and 416, processor 106 of system 100 could then be used to carry out step 418, namely to identify a virtual machine with a high I/O ranking (determined in step 408) associated with a first data object and a first storage component with a high storage utilization ranking (determined in step 416). Additionally, processor 106 can be used to identify a second data object associated with a second storage component with a low storage ranking in step 420. Once a virtual machine with a high I/O ranking associated with a first storage component with high storage utilization ranking has been identified in step 418, processor 106 of system 100 could then be used to carry out step 422 in which a virtual machine identified in step 418 is moved from the first data object to the second data object, so that in turn, the identified virtual machine stops accessing the first storage component with the high storage utilization ranking identified in step 418, and begins accessing the second storage component with the low storage utilization ranking identified in step 420. Movement of the virtual machines could be carried out by Storage VMotion, VMWare DRS, or other similar solutions.

FIGS. 5-8 show different views of analyzed traffic and storage load information that could be displayed on display 108 of system 100 in FIG. 1.

Figure 5:
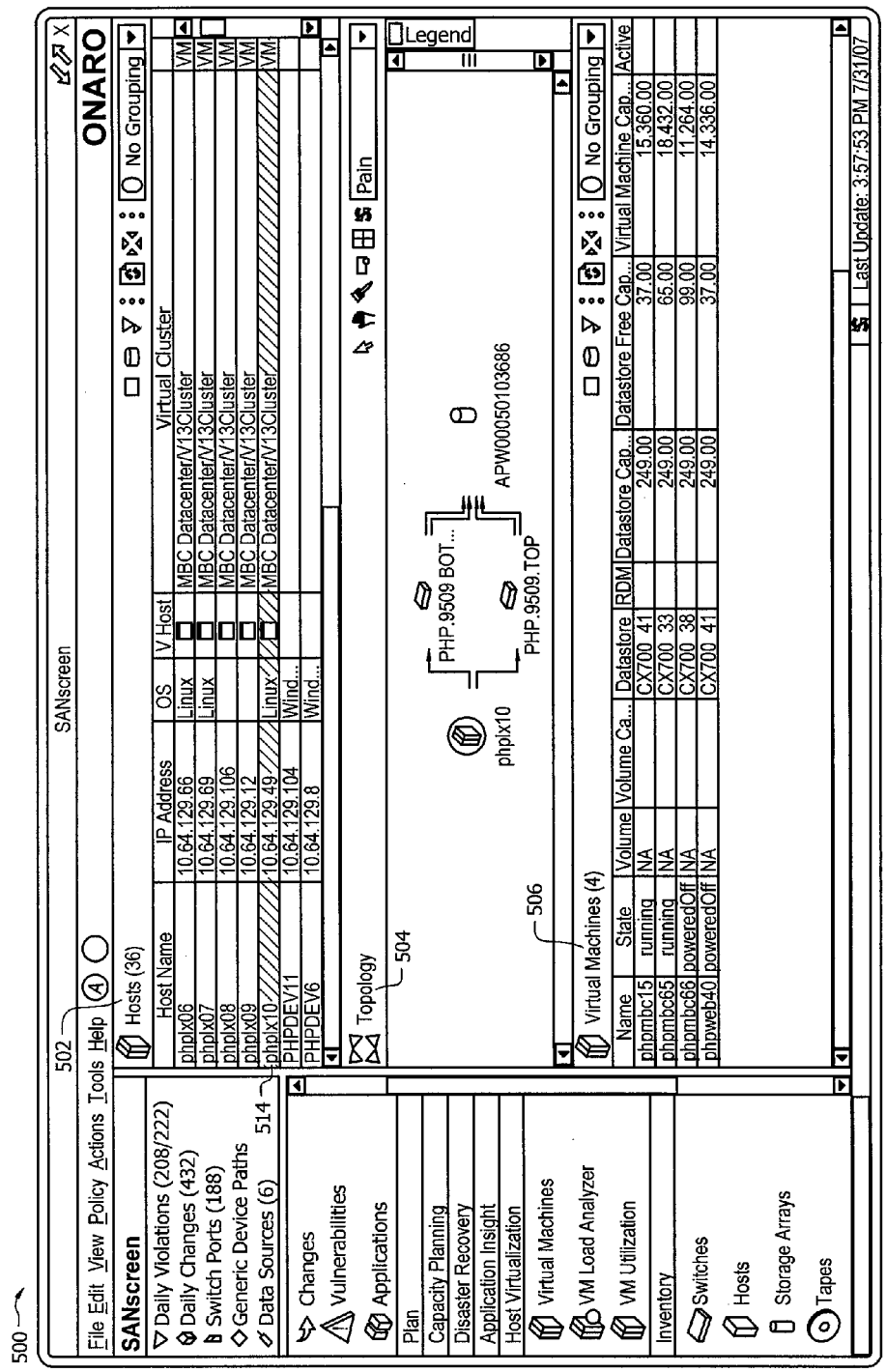
FIG. 5 is an exemplary display of connectivity information associated with virtual hosts in the virtual server network according to an illustrative embodiment.

FIG. 5 is an exemplary display of connectivity information associated with virtual hosts in the virtual server network. FIG. 5 shows window 500 which includes host information 502, topology information 504 associated with the selected host and virtual machine information 506 associated with the selected host. Window 500 could be viewed on display 108 of system 100 in FIG. 1. For instance, window 500 shows that host "phplx10" 514 has IP Address "10.64.129.46", is running a Linux OS, and is part of the "MBC Datacenter/ V13Cluster" Virtual Cluster. Additionally, virtual machine data 506 associated with the selected host 514 is shown in window 500. The host data 502 and virtual machine data 506 shown in window 500 may be collected by processor 106 of system 100 during step 402 of process 400. Window 500 also show the topology 504, including access paths, associated with selected host 514. The topology data 504 may be collected by processor 106 of system 100 during step 404 of process 400. The drop-down menus on the top right corner of window 500 could be used to view host data by groups of components, individual components, or by logical access path.

Figure 6:
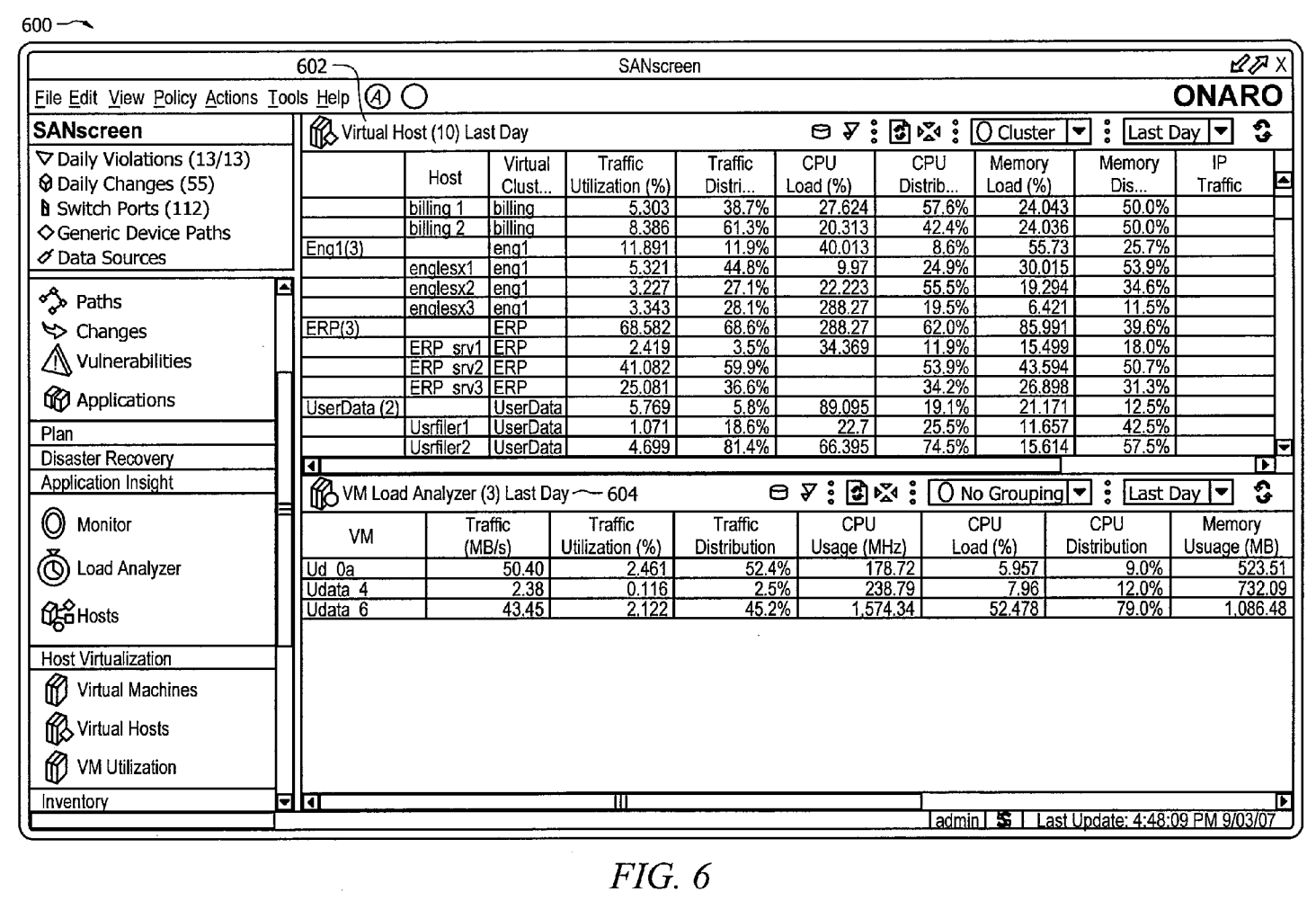

FIG. 6 is an exemplary display of traffic and state information associated with virtual hosts in the virtual server network. FIG. 6 shows window 600 which includes virtual host data 602 and virtual machine load analysis 604 from the last day. Window 600 could be viewed on display 108 of system 100 in FIG. 1. In particular, window 600 shows traffic utilization, traffic distribution, CPU load, CPU distribution, memory load and memory distribution for virtual hosts 602 and virtual machines associated with the virtual hosts in the virtual server environment. The data presented in window 600 may be collected by processor 106 of system 100 in step 402 and utilized by processor 106 to carry out step 406 in which a virtual machine is ranked based upon the amount of I/O traffic it creates. The drop-down menus on the top right corner of window 600 could be used to view virtual host 602 and virtual machine 604 data by groups of components, individual components, or by logical access path. These menus could also be used to select the time period over which the user is analyzing the data, e.g., last week.

Figure 7A:
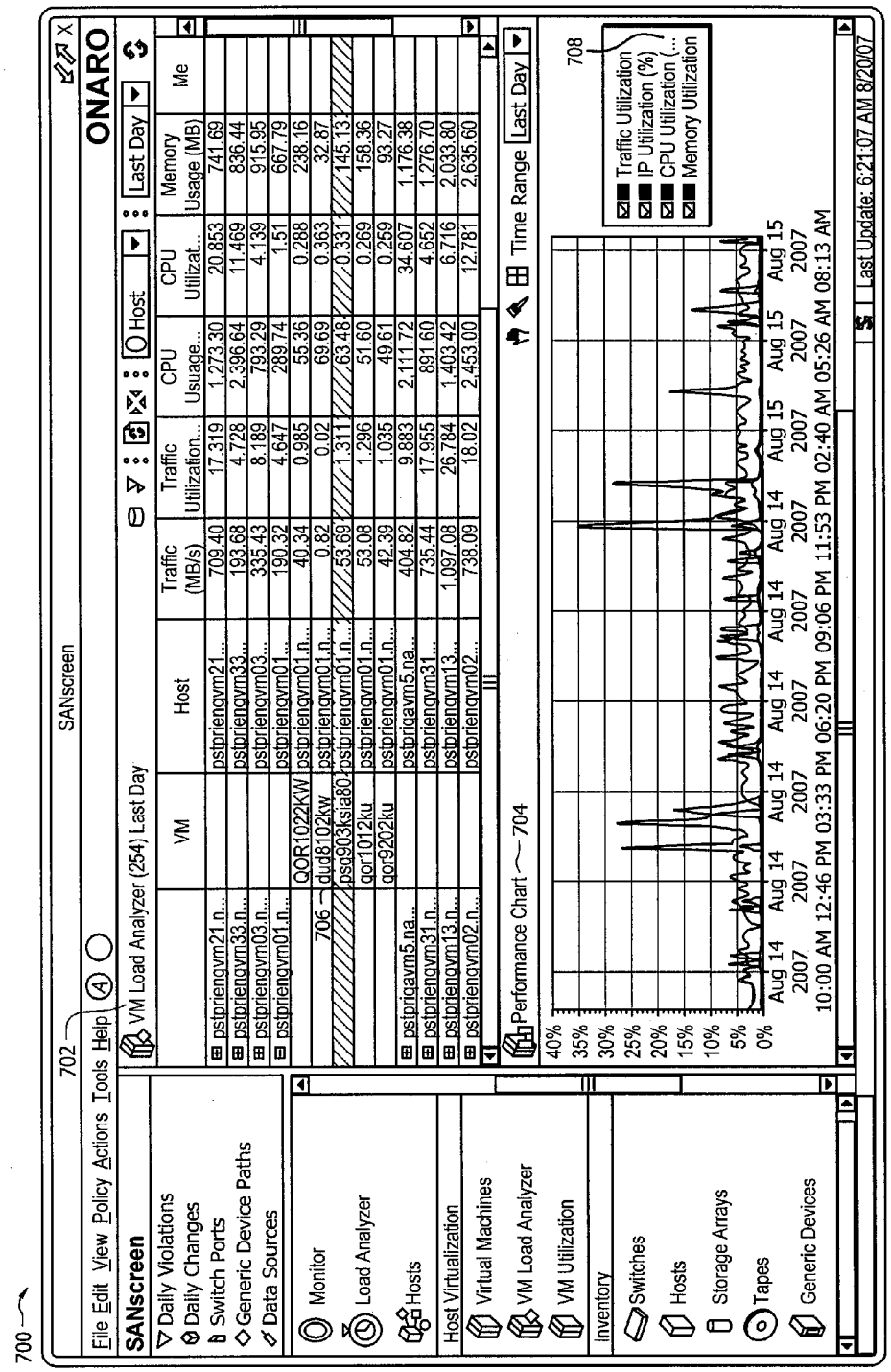
FIGS. 7A and 7B are exemplary displays of load and performance data associated with virtual machines in the virtual server network according to an illustrative embodiment.

FIG. 7A is an exemplary display of load and performance data associated with virtual machines in the virtual server network. FIG. 7A shows window 700 which includes VM load analyzer data 702 and a performance chart 704 based on the VM load analyzer data 702 from the last day. Window 700 could be viewed on display 108 of system 100 in FIG. 1. In window 700, a virtual machine 706 is selected and data about the selected virtual machine is displayed. This data includes the associated host, traffic (MB/s), traffic utilization, CPU usage, CPU utilization and memory usage. Additionally, the performance chart 704 of window 700 displays the performance associated with the selected virtual machine 706. Various performance parameters may be displayed in the performance chart 704 and may be toggled on and off through user interface 102 of system 100. An example of the performance parameters is shown in panel 708. In one embodiment, the data presented in window 700, including the VM load analyzer data 702 and performance chart data 704 may be collected by processor 106 of system 100 in step 402 and utilized by processor 106 to carry out step 406 in which a virtual machine is ranked based upon the amount of I/O traffic it creates. In other embodiments, a user may view the VM load analyzer data 702 and performance chart 704 on display 108 of system 100 and, using user interface 102, rank the VMs based on their performance attributes. The drop-down menus on the top right corner of window 700 could be used to view VM load analyzer 702 data by groups of components, individual components, or by logical access path. These menus could also be used to select the time period over which the user is analyzing the data, e.g., last week.

Figure 7B:
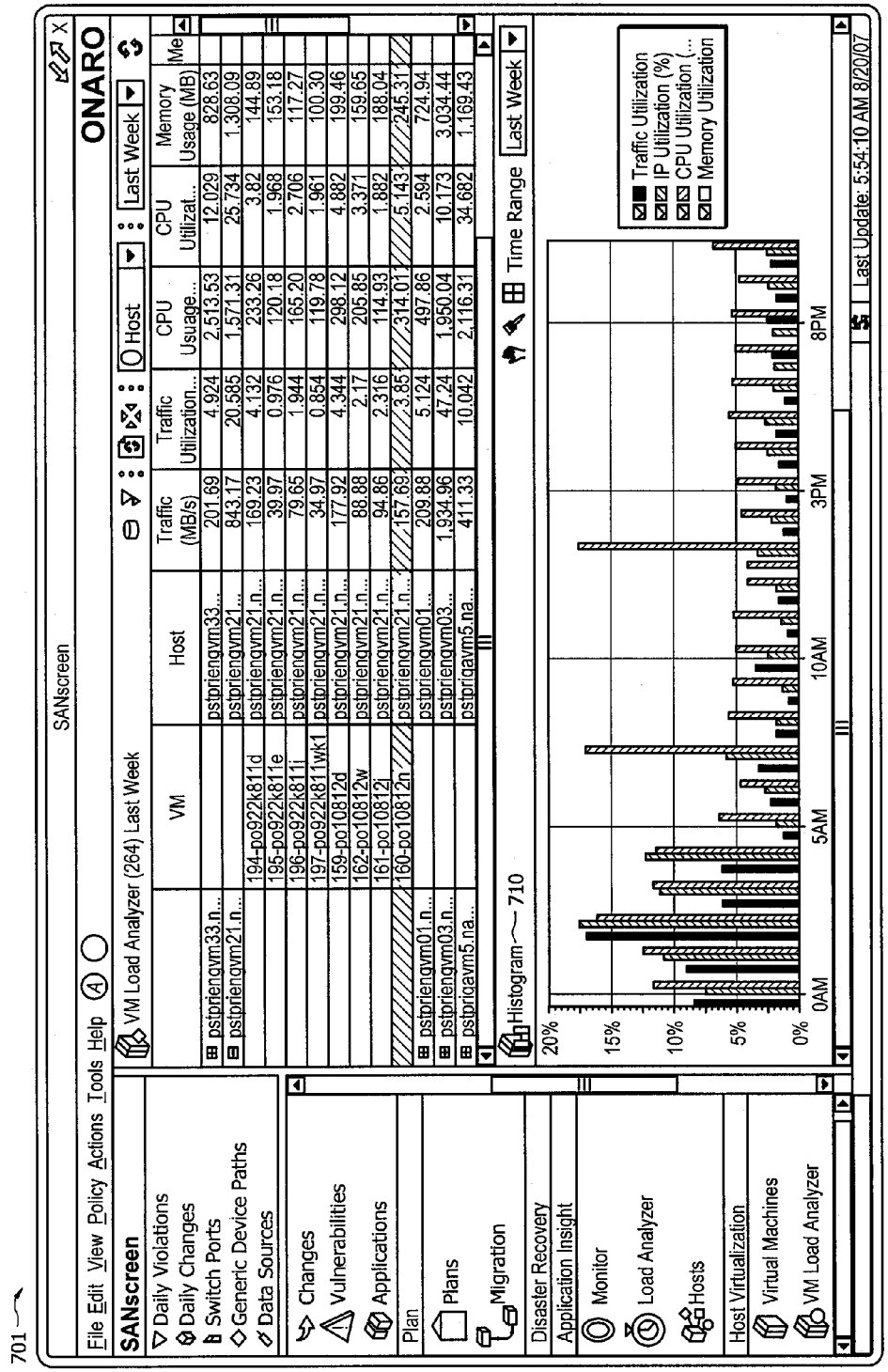

FIG. 7B is another exemplary display of load and performance data associated with virtual machines in the virtual server network. FIG. 7B shows window 701 which includes VM load analyzer data and a histogram 710 based on the VM load analyzer data from the last week. Window 700 could be viewed on display 108 of system 100 in FIG. 1. Window 701 is similar to window 700 of FIG. 7A including data about a selected VM, and showing a histogram 710 of the associated performance parameters of the selected VM.

FIG. 8 is an exemplary display of storage utilization data associated with virtual machines and storage components in the virtual server network. FIG. 8 shows window 800 which includes storage utilization data 802 associated with VMs in the virtual server environment. Window 800 could be viewed on display 108 of system 100 in FIG. 1. In particular, window 800 shows the volume associated with a particular VM, the volume capacity, the datastore associated with a particular VM, the datastore capacity, the datastore free capacity, and the virtual machine capacity for virtual machines in the virtual server environment. In one embodiment, the data presented in window 800 may be collected by processor 106 of system 100 in step 410 and utilized by processor 106 to carry out step 412 and 414 of process 400 in which storage utilization is calculated for storage components in the virtual server environment and the storage components are ranked based on their calculated storage utilization. In other embodiments, a user may view the storage utilization data 802 associated with a particular VM on display 108 of system 100 and, using user interface 102, rank the storage components based on the displayed data 802.

It will be apparent to those of ordinary skill in the art that methods involved herein may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

While the invention has been disclosed in connection with the embodiments shown and described in detail, various modifications and improvements may be made thereto without departing from the spirit and scope of the invention. By way of example, although the illustrative embodiments are depicted with reference to a virtual server environment, this need not be the case. The principles of the invention can also be applied in a similar way to additional types of networks and infrastructures. For example, a similar analysis can be applied to storage arrays or network in which there is replicated data. Instead, other storage infrastructures with defined access paths may employ the method of the invention, and the network fabric may include any type of device that provides the described connectivity between storage environment components. Accordingly, the spirit and scope of the present invention is to be limited only by the following claims.

What is claimed is:

1. A method correcting a storage load imbalance in a storage network environment with virtual clusters, each having one or more virtual machines, the method comprising:
   generating an input/output (I/O) ranking for each of the virtual machines based on I/O traffic between the virtual machines and storage devices associated with the virtual machines;
   generating a storage utilization ranking for each of the storage devices based on I/O requests that are unavailable at an array cache, wherein the requests are from the virtual machines to associated storage devices;
   identifying a first virtual machine on a first virtual cluster with an I/O ranking, which is higher than an I/O threshold, associated with a first storage device having a first storage utilization ranking which is higher than a threshold;
   identifying a second virtual cluster associated with a second storage device having a second storage utilization ranking which is lower than the threshold; and
   moving the first virtual machine from the first virtual cluster to the second virtual cluster.

2. The method of claim 1, wherein the moving the first virtual machine from the first virtual cluster to the second virtual cluster results in the first virtual machine being associated with the second storage device instead of the first storage device.

3. The method of claim 1, further comprising:
   creating an alert in response to a determination that the I/O ranking is higher than the I/O threshold, wherein the moving the first virtual machine is responsive to the alert.

4. The method of claim 1, further comprising:
   creating an alert in response to a determination that the second storage utilization ranking is lower than the threshold, wherein the moving the first virtual machine is responsive to the alert.

5. The method of claim 1, wherein the I/O threshold comprises a predetermined number of requests per time period.

6. The method of claim 1, wherein the threshold comprises a predetermined level of storage utilization.

7. The method of claim 1, wherein the generating an I/O ranking comprises:
   deriving one or more access paths in the storage network environment and analyzing I/O traffic along the one or more access paths, wherein each of the one or more access paths comprises an end-to-end relationship between at least one virtual machine and an associated storage device in the storage network environment; and
   collecting information from components in the storage network environment, the information including state and connectivity information of the virtual machines.

8. The method of claim 7, wherein deriving an access path includes:
   determining a sequence of components starting with an application on a virtual server, a sequence of one or more switches and physical communication links leading to a storage controller, and a storage device containing a data object that is associated with the virtual server;
   collecting one of logical and configuration information for the sequence of components;
   determining if the sequence of components is configured for data flow along the sequence of components; and
   if the sequence of components is configured for data flow, storing the sequence of components and the collected information, thereby deriving an access path.

9. The method of claim 1, wherein storage utilization is computed as a ratio of an amount of total I/O requests from a virtual machine provided by a physical storage device which are unavailable at the array cache to a storage capability of the physical storage device.

10. The method of claim 1, wherein the moving the first virtual machine comprises copying the first virtual machine from the first virtual cluster to the second virtual cluster, deleting the first virtual machine from the first virtual cluster, and reconfiguring the second virtual cluster.

11. The method of claim 1, wherein the first storage device is associated with a first data object comprising at least one of a volume, a datastore, and a file system, and wherein the second storage device is included in a second data object comprising at least one of a volume, a datastore, and a file system.

12. A computer program product implemented in a non-transitory computer-readable medium, the computer program product comprising:
   computer code that generates an input/output (I/O) ranking for each of virtual machines of a storage network environment based on I/O traffic between the virtual machines and storage devices associated with the virtual machines, wherein the virtual machines are included in virtual clusters of the storage network environment;
   computer code that generates a storage utilization ranking for each of the storage devices based on I/O requests that are unavailable at an array cache, wherein the requests are from the virtual machines to associated storage devices;
   computer code that identifies a first virtual machine on a first virtual cluster with an I/O ranking, which is higher than an I/O threshold, associated with a first storage device having a first storage utilization ranking which is higher than a threshold;
   computer code that identifies a second virtual cluster associated with a second storage device having a second storage utilization ranking which is lower than the threshold; and
   computer code that moves the first virtual machine from the first virtual cluster to the second virtual cluster.

13. The computer program product of claim 12, wherein, when the first virtual machine is moved from the first virtual cluster to the second virtual cluster, the first virtual machine is associated with the second storage device instead of the first storage device.

14. The computer program product of claim 12, further comprising:
   computer code that creates an alert in response to a determination that the high I/O ranking is higher than the I/O threshold, wherein the first virtual machine is moved from the first virtual cluster to the second virtual cluster responsive to the alert.

15. The computer program product of claim 12, further comprising:
   computer code that creates an alert in response to a determination that the second storage utilization ranking is lower than the threshold, wherein the first virtual machine is moved from the first virtual cluster to the second virtual cluster responsive to the alert.

16. The computer program product of claim 12, wherein the I/O threshold comprises a predetermined number of requests per time period.

17. The computer program product of claim 12, wherein the threshold comprises a predetermined level of storage utilization.

18. The computer program product of claim 12, wherein the computer code that generates an I/O ranking comprises:
   computer code that collects information from components in the storage network environment, the information including state and connectivity information of the virtual machines; and
   computer code that derives one or more access paths in the storage network environment and analyzes I/O traffic along the one or more access paths, wherein each of the one or more access paths comprises an end-to-end relationship between at least one virtual machine and an associated storage device in the storage network environment.

19. The computer program product of claim 18, wherein the computer code that derives one or more access path comprises:
   computer code that determines a sequence of components starting with an application on a virtual server, a sequence of one or more switches and physical communication links leading to a storage controller, and a storage device containing a data object that is associated with the virtual server;
   computer code that collects one of logical and configuration information for the sequence of components;
   computer code that determines if the sequence of components is configured for data flow along the sequence of components; and
   computer code that stores the sequence of components and the collected information, thereby deriving an access path if the sequence of components is configured for data flow.

20. The computer program product of claim 12, wherein storage utilization is computed as a ratio of an amount of total I/O requests from a virtual machine provided by storage devices which are unavailable at the array cache to a storage capability of the storage devices.

21. The computer program product of claim 12, wherein moving the first virtual machine comprises copying the first virtual machine from the first virtual cluster to the second virtual cluster, deleting the first virtual machine from the first virtual cluster, and reconfiguring the second virtual cluster.

22. The computer program product of claim 12, wherein the first storage device is associated with a first data object comprising at least one of a volume, a datastore, and a file system, and wherein the second storage device is included in a second data object comprising at least one of a volume, a datastore, and a file system.

23. A system operable with a storage network environment with virtual clusters, each having one or more virtual machines, the system comprising:
   a storage management platform in communication with components of the storage network environment, the storage network environment implementing the virtual clusters, each having the one or more virtual machines, wherein the storage management platform includes a virtual machine load balancer operable to provide management of the virtual machines to correct a storage load imbalance, the virtual machine load balancer operable to:
   generate an input/output (I/O) ranking for each of the virtual machines based on I/O traffic between the virtual machines and storage devices associated with the virtual machines;
   generate a storage utilization ranking for each of the storage devices based on I/O requests that are unavailable at an array cache, wherein the requests are from the virtual machines to associated storage devices;
   identify a first virtual machine on a first virtual cluster with an I/O ranking, which is higher than an I/O threshold, associated with a first storage device having a first storage utilization ranking which is higher than a threshold;
   identify a second virtual cluster associated with a second storage device having a second storage utilization ranking is lower than the threshold; and
   move the first virtual machine from the first virtual cluster to the second virtual cluster.

24. The system of claim 23, wherein the virtual machine load balancer being operable to move the first virtual machine from the first virtual cluster to the second virtual cluster results in the first virtual machine being associated with the second storage device instead of the first storage device.

25. The system of claim 23, wherein the virtual machine load balancer is further operable to:
   create an alert in response to a determination that the high I/O ranking is higher than the I/O threshold, wherein the moving the first virtual machine is responsive to the alert.

26. The system of claim 23, wherein the machine load balancer is further operable to:
   create an alert in response to a determination that the second storage utilization ranking is lower than the threshold, wherein the moving the first virtual machine is responsive to the alert.

27. The system of claim 23, wherein the I/O threshold comprises a predetermined number of requests per time period.

28. The system of claim 23, wherein the threshold comprises a predetermined level of storage utilization.

29. The system of claim 23, wherein the virtual machine load balancer being operable to generate an I/O ranking comprises:
   the virtual machine load balancer being operable to collect information from components in the storage network environment, the information including state and connectivity information of the virtual machines; and
   the virtual machine load balancer being operable to derive one or more access paths in the storage network environment and analyzing I/O traffic along the one or more access paths, wherein each of the one or more access paths comprises an end-to-end relationship between at least one virtual machine and an associated storage device in the storage network environment.

30. The system of claim 29, wherein the virtual machine load balancer being operable to derive an access path includes:
   the virtual machine load balancer being operable to determine a sequence of components starting with an application on a virtual server, a sequence of one or more switches and physical communication links leading to a storage controller, and a storage device containing a data object that is associated with the virtual server;
   the virtual machine load balancer being operable to collect one of logical and configuration information for the sequence of components;
   the virtual machine load balancer being operable to determine if the sequence of components is configured for data flow along the sequence of components; and
   if the sequence of components is configured for data flow, the virtual machine load balancer is operable to store the sequence of components and the collected information, thereby deriving an access path.

31. The system of claim 23, wherein storage utilization is computed as a ratio of an amount of total I/O requests from a virtual machine provided by storage devices which are unavailable at the array cache to a storage capability of the storage devices.

32. The system of claim 23, wherein virtual machine load balancer being operable to move the first virtual machine comprises copying the first virtual machine from the first virtual cluster to the second virtual cluster, deleting the first virtual machine from the first virtual cluster, and reconfiguring the second virtual cluster.

33. The system of claim 23, wherein the first storage device is associated with a first data object comprising at least one of a volume, a datastore, and a file system, and wherein the second storage device is included in a second data object comprising at least one of a volume, a datastore, and a file system.

* * * * *